United States Patent
Heigl

(10) Patent No.: US 9,549,155 B2
(45) Date of Patent: Jan. 17, 2017

(54) CONFIGURATION MODULE FOR A VIDEO SURVEILLANCE SYSTEM, SURVEILLANCE SYSTEM COMPRISING THE CONFIGURATION MODULE, METHOD FOR CONFIGURING A VIDEO SURVEILLANCE SYSTEM, AND COMPUTER PROGRAM

(75) Inventor: Stephan Heigl, Nuremberg (DE)

(73) Assignee: Robert Bosch GmbH, Stuttgart (DE)

( * ) Notice: Subject to any disclaimer, the term of this patent is extended or adjusted under 35 U.S.C. 154(b) by 886 days.

(21) Appl. No.: 12/667,285

(22) PCT Filed: Sep. 15, 2008

(86) PCT No.: PCT/EP2008/062228
§ 371 (c)(1),
(2), (4) Date: Dec. 30, 2009

(87) PCT Pub. No.: WO2009/062770
PCT Pub. Date: May 22, 2009

(65) Prior Publication Data
US 2010/0194859 A1 Aug. 5, 2010

(30) Foreign Application Priority Data
Nov. 12, 2007 (DE) .......................... 10 2007 053 812

(51) Int. Cl.
*H04N 7/18* (2006.01)
*G08B 13/196* (2006.01)

(52) U.S. Cl.
CPC .......... *H04N 7/181* (2013.01); *G08B 13/1968* (2013.01); *G08B 13/19641* (2013.01); *G08B 13/19652* (2013.01)

(58) Field of Classification Search
CPC .... H04N 7/181; H04N 21/4223; H04N 7/183; H04N 19/174; H04N 19/543; H04N 21/21805; H04N 21/42202; H04N 21/4728; H04N 5/217; H04N 5/23216; H04N 7/185; G06K 9/00771
See application file for complete search history.

(56) References Cited

U.S. PATENT DOCUMENTS 7,069,516 B2 * 6/2006 Rekimoto ............... G06F 3/011
715/757
7,146,052 B2 * 12/2006 Sugimura et al. ............ 382/232
(Continued)

FOREIGN PATENT DOCUMENTS

EP 1 061 487 12/2000
WO 97/01135 1/1997
(Continued)

Primary Examiner — Tracy Y Li
(74) Attorney, Agent, or Firm — Michael J. Striker

(57) ABSTRACT

A configuration module (6) for a video surveillance system (1) having a plurality of surveillance cameras (2 a-d) which are and/or may be distributed throughout a surveillance region (3) including, a model memory (7) which is designed to provide a model (10) of the surveillance region (3), camera data of the surveillance cameras (2 a-d) being entered and/or referenced in the model (10); an input interface (11) for the input of at least one surveillance target (5) into the model (10); a computing device (12) which determines at least one camera-specific surveillance target section (13 a, b) for at least one of the surveillance cameras (2 a, b) based on the surveillance target (5) that was input; and a hidden-region checking device (16) which is designed to a check whether the surveillance target (5) is hidden in front of one of the surveillance cameras (2 a-d).

15 Claims, 2 Drawing Sheets

(56) References Cited

U.S. PATENT DOCUMENTS

| | | | |
|---|---|---|---|
| 7,167,519 B2* | 1/2007 | Comaniciu et al. | 375/240.08 |
| 7,218,342 B2* | 5/2007 | Kobayashi et al. | 348/211.8 |
| 7,257,237 B1* | 8/2007 | Luck et al. | 382/103 |
| 7,796,155 B1* | 9/2010 | Neely, III | G06K 9/00771 |
| | | | 345/418 |
| 8,482,609 B1* | 7/2013 | Mishra | H04N 7/181 |
| | | | 348/143 |
| 2004/0096085 A1* | 5/2004 | Matsumoto | A63B 24/0003 |
| | | | 382/107 |
| 2004/0125207 A1* | 7/2004 | Mittal et al. | 348/169 |
| 2004/0196282 A1* | 10/2004 | Oh | G06T 7/0022 |
| | | | 345/419 |
| 2005/0069223 A1* | 3/2005 | Tanimura | G06K 9/00362 |
| | | | 382/284 |
| 2006/0077255 A1* | 4/2006 | Cheng | 348/143 |
| 2006/0109242 A1* | 5/2006 | Simpkins | 345/156 |

FOREIGN PATENT DOCUMENTS

| | | |
|---|---|---|
| WO | 2005/050971 | 6/2005 |
| WO | 2006/107999 | 10/2006 |

* cited by examiner

CONFIGURATION MODULE FOR A VIDEO SURVEILLANCE SYSTEM, SURVEILLANCE SYSTEM COMPRISING THE CONFIGURATION MODULE, METHOD FOR CONFIGURING A VIDEO SURVEILLANCE SYSTEM, AND COMPUTER PROGRAM

CROSS-REFERENCE

The invention described and claimed hereinbelow is also described in PCT/EP2008/062228, filed on Sep. 15, 2008 and DE 10 2007 053 812.1, filed on Nov. 12, 2007. This German Patent Application, whose subject matter is incorporated here by reference, provides the basis for a claim of priority of invention under 35 U.S.C. 119 (a)-(d).

BACKGROUND OF THE INVENTION

The present invention relates to a configuration module for a video surveillance system for configuring a plurality of surveillance cameras which are and/or may be distributed throughout a surveillance region, and a related video surveillance system, a method, and a computer program.

Video surveillance systems typically include a plurality of video cameras which are distributed throughout a surveillance region. The image data recorded by the surveillance cameras are combined in a surveillance center, where they are evaluated in an automated manner or by surveillance personnel. In terms of automated surveillance, it is known that certain image regions of a surveillance camera are selected and continually monitored using digital image processing.

For example, WO2005/050971 discloses a video surveillance system comprising a plurality of surveillance cameras for a building or the like, in which a surveillance camera is configured such that an alarm is triggered when a virtual trip wire set up in the image region of the surveillance camera is passed through. In that configuration, the virtual trip wire is input into a single video image of the surveillance camera to be configured.

SUMMARY OF THE INVENTION

According to the present invention, a configuration module, a surveillance system, a method for configuring a surveillance system, and a computer program are disclosed.

According to the present invention, a configuration module which is suited and/or designed to configure a video surveillance system having a plurality of surveillance cameras is proposed. The plurality of surveillance cameras is and/or may be distributed throughout a surveillance region. The surveillance region may have any design, and, in particular, may be in the form of one or more rooms in a building, one or more streets, intersections, industrial grounds, etc.

The configuration module includes a model memory which may be designed as volatile or non-volatile memory, and which provides a model of the surveillance region. The model is, e.g., an image, a map, an outline or the like of the surveillance region, and/or includes the geometric expansions and/or dimensions thereof. Expressed mathematically, the model shows the surveillance region, which is located in a global coordinate system, in a model coordinate depiction.

Camera data on the surveillance cameras are input into and/or referenced in the model. In particular, the surveillance cameras are input into the model in model coordinates for position and orientation.

In one possible embodiment, the model and the camera data are stored continually in the model memory. In other alternatives, the aforementioned data are not compiled until the configuration module runs.

The configuration module includes an input interface which is connected and/or connectable, e.g., to a human-machine interface (HMI), the input interface being suited and/or designed for the input of at least one surveillance target in the model. The surveillance target may be input, e.g., into the model such that it extends across the detection region, i.e., the region detected by the video cameras in the surveillance region by at least two of the surveillance cameras, or such that it extends further than the detection region of one of the surveillance cameras. In particular, the surveillance target may also be input such that is partially overlaps or partially does not overlap the detection region of one of the surveillance cameras. The surveillance target may therefore be input into the model independently of the placement of the surveillance cameras. The surveillance target is preferably input in model coordinates.

A computing device, as part of the configuration module, is designed to determine at least one camera-specific surveillance target section for at least one of the surveillance cameras based on the surveillance target that was input. In a preferred embodiment, surveillance target sections are formed based on the surveillance target that was input, and that extends, e.g., across the detection region of at least two surveillance cameras, every surveillance target section being assigned to exactly one surveillance camera. Preferably, every surveillance target section corresponds to the part of the surveillance target located in the detection region of the assigned surveillance camera. If the detection regions of the surveillance cameras overlap, then the surveillance target sections of a surveillance target may also overlap.

One consideration of the present invention is that the single-cell configuration of surveillance cameras implemented to date in a video surveillance system is complex and prone to error. In particular, when the aim is to activate surveillance targets that extend across detection regions of at least two surveillance cameras, the at least two surveillance cameras had to be configured individually such that the transition of the surveillance target between the detection regions actually corresponds to the desired requirements. It has therefore been a complex undertaking to activate a virtual trip wire in a surveillance system that extends across the detection region of a plurality of surveillance cameras since a step or another inconsistency usually creeps in when transitioning from one detection region to the next. The procedure of changing the position of the surveillance target has also been complex since every individual surveillance camera must be reconfigured separately.

In contrast, the present invention proposes that the surveillance target is entered into a model, and that the surveillance target is converted to camera-specific surveillance target sections in an automated manner. In other words, a user may input, e.g., a virtual trip wire into the model simply by defining two end points, and one, two, three or more surveillance cameras are automatically configured via the output of the camera-specific surveillance target sections for the surveillance cameras. The advantages of the present invention are therefore that it is easier to operate, and that its operation is less prone to error.

In a preferred embodiment of the present invention, the surveillance cameras are situated in a stationary manner, although in modified embodiments the surveillance cameras may be designed as movable, and in particular PTZ (pantilt-zoom), cameras, and the camera-specific surveillance target sections are formed depending on the current camera position.

In a further preferred embodiment of the present invention, it is provided that the surveillance target is situated in the model and/or surveillance region in a stationary manner. In this preferred embodiment, the surveillance target is not designed, in particular, as a moving surveillance object.

In one possible realization of the present invention, the surveillance target and/or surveillance target section is designed as a line or a continuous line, e.g., including support points and/or interpolation sections, as a surface, in particular as a polygon and/or a three-dimensional section, in particular a volume. Generally stated, the surveillance target may be depicted as a geometric body that extends preferably horizontally in the surveillance region, although modified embodiments may include sections that extend vertically or that have any other orientation.

In a first possible embodiment, the surveillance target is designed as a virtual trip wire, and in a second possible embodiment, the surveillance target is designed as a surface section that characterizes, e.g., a blocked region in the surveillance region. It is also possible for the surveillance target to be designed as a volume, e.g., as a cylinder, in the center of which a protected object is located.

In one possible embodiment, the model is designed as a 2-D or 3-D model, the 2-D model being realized, e.g., as an outline of the surveillance region. In one possible 3-D model, the outline and stationary objects, e.g., walls, are modeled. In one expansion, quasi-stationary objects such as cabinets, working machines, or the like may be depicted in the model.

In particular, although not exclusively in the embodiment using a 3-D model, it is preferred that the configuration model include a hidden-region checking device which is designed to a check whether the surveillance target or the surveillance target section is hidden in front of one of the surveillance cameras. According to one possible implementation, the models or objects in the model are provided with a Z hierarchy and are checked to determine whether the surveillance target section is situated such that it is fully or at least partially visible in front of the particular surveillance camera.

In a practical realization of the present invention, the camera data that are input into and/or referenced in the model include a camera model, a camera position, and/or a camera orientation. The camera model describes the optical properties, in particular the imaging properties of the surveillance camera, and makes it possible, in conjunction with the data on the camera position and/or orientation, to project the image points from an image coordinate system of the surveillance camera into the model coordinate system or in the opposite direction.

In one possible specific implementation of the present invention, the computing device is programmed and/or electronically configured to determine the surveillance target sections by projecting the surveillance targets, which exist in model coordinates, into the image coordinate system of the particular corresponding surveillance camera and possibly cropping them. In particular, the projected surveillance targets are cropped on the edges and/or in regions that are hidden by stationary and/or quasi-stationary objects and/or that lie outside of the image detection region of the particular surveillance camera.

A further subject matter of the present invention relates to a video surveillance system, in which the video surveillance system is connected and/or connectable to a plurality of surveillance cameras, the surveillance cameras being distributed and/or distributable throughout a surveillance region, and in which the video surveillance system includes the configuration module as described above.

In a practical development of the present invention, the video surveillance system includes at least one surveillance device that is programmed and/or electronically configured to monitor at least one of the surveillance target sections by evaluating the video data streams of the surveillance cameras using digital image processing algorithms. The surveillance device is designed, in particular, to detect and/or track surveillance objects, object movements, or the like in the surveillance target sections.

In one possible architecture, the video surveillance system includes a plurality of surveillance devices, and every surveillance device is assigned to at least one or exactly one surveillance camera. This aspect of the present invention therefore relates to a decentralized distribution of the surveillance devices in the video surveillance system, thereby enabling the image data streams from the surveillance cameras to be at least partially evaluated in a parallel architecture.

In a particularly preferred design of the present invention, the at least one surveillance camera is designed as an "intelligent camera" which includes a processor unit, e.g., in the same housing, the surveillance device being integrated locally in the surveillance camera, in particular in the processor unit. This aspect of the present invention makes it possible to easily configure a network of intelligent cameras using the configuration module.

A further subject matter of the present invention relates to a method for configuring a or the surveillance system, in which, in a first step, the surveillance target, e.g., in the form of a geometric figure, is input into the model of the surveillance region and, in a second step, the surveillance target is converted into the camera-specific surveillance target sections of the individual surveillance cameras.

BRIEF DESCRIPTION OF THE DRAWINGS

Further features, advantages, and effects of the present invention result from the following description of a preferred embodiment.

DETAILED DESCRIPTION OF THE PREFERRED EMBODIMENT(S)

Figure 1:
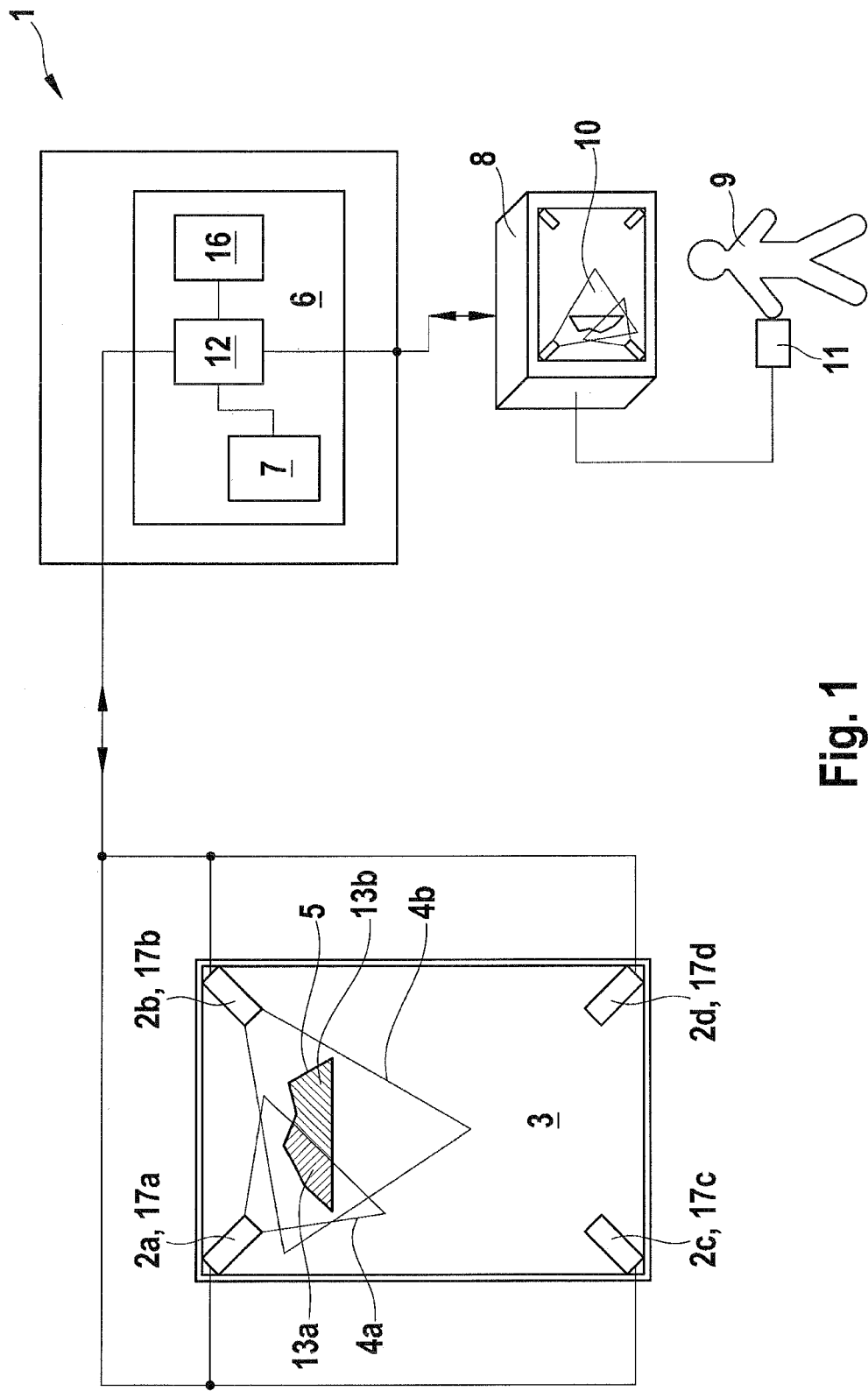
FIG. 1 shows a schematic depiction of a video surveillance system that includes a configuration module, as one embodiment of the present invention.

FIG. 1 shows a video surveillance system 1 which is connected wirelessly or via cable to a plurality of surveillance cameras 2a, b, c, d in a signal-transmitting manner. Surveillance cameras 2a-d are distributed throughout a real surveillance region which is depicted as a room 3 in the surveillance region in FIG. 1. In modified embodiments it is also possible for the surveillance region to be rambling, angled, multistoried, etc., in design.

Detection regions 4a and 4b, of surveillance cameras 2a and 2b, respectively, are depicted schematically, and they partially overlap. A surveillance target 5 is shown, which also overlaps detection regions 4a, 4b, and which is designed as a polygon and extends horizontally in room 3. A surveillance target 5 of this type is arranged in a surveillance region, e.g., when surveillance target 5 must not be stepped upon or passed over by objects under surveillance, e.g., visitors, without the surveillance system emitting an alarm.

As shown in FIG. 1, although surveillance target 5 is located entirely in detection region 4b of surveillance camera 2b, it is only partially located in detection region 4a of surveillance camera 2a. Without taking any further action, surveillance system 1 would have to be configured such that, in a first step, surveillance target 5 is input with regard for surveillance camera 2b and, in a second step, it is input with regard for surveillance camera 2a. A particular difficulty that exists is the fact that surveillance target 5 extends only partially into detection region 4a and must therefore be cut off in the input. It is particularly difficult to input the transition of surveillance target 5 in the boundary or overlap region of detection regions 4a and 4b with sufficient accuracy.

To simplify the configuration of surveillance cameras 2a through *d*, video surveillance system 1 includes a configuration module 6 that simplifies the configuration of surveillance cameras 2a through *d*.

Configuration module 6 includes a model memory 7 that provides a model 10 of the surveillance region, which is room 3 in this case, including surveillance cameras 2a through *d* as shown. Model 10 is designed, e.g., as a 2-D model, and may be made available to an observer 9 as a graphic depiction in a display unit 8. Using a human-machine interface 11, observer 9 may easily draw surveillance target 5 in model 10, and, in fact, independently of the position of surveillance cameras 2a through 2d.

Configuration module 6 includes a computing device 12 which accesses model memory 7 including model 10, and the data on surveillance target 5 that was input, and, based on these data, generates camera-specific surveillance target sections 13a and 13b.

As shown in the depiction of room 3, surveillance target section 13b includes entire surveillance target 5 since it is located entirely in detection region 4b of surveillance camera 2b. Surveillance target section 13a, however, is depicted only as a partial quantity of surveillance target 5, and, in fact, exactly as the partial quantity that is recorded by detection region 4a of surveillance camera 2a.

Surveillance target 5 is converted to surveillance target sections 13a, b by projecting surveillance target 5 from the model coordinates—depicted in display device 8—of model 10 into the image coordinates of surveillance cameras 2a through 2d.

Figure 2:
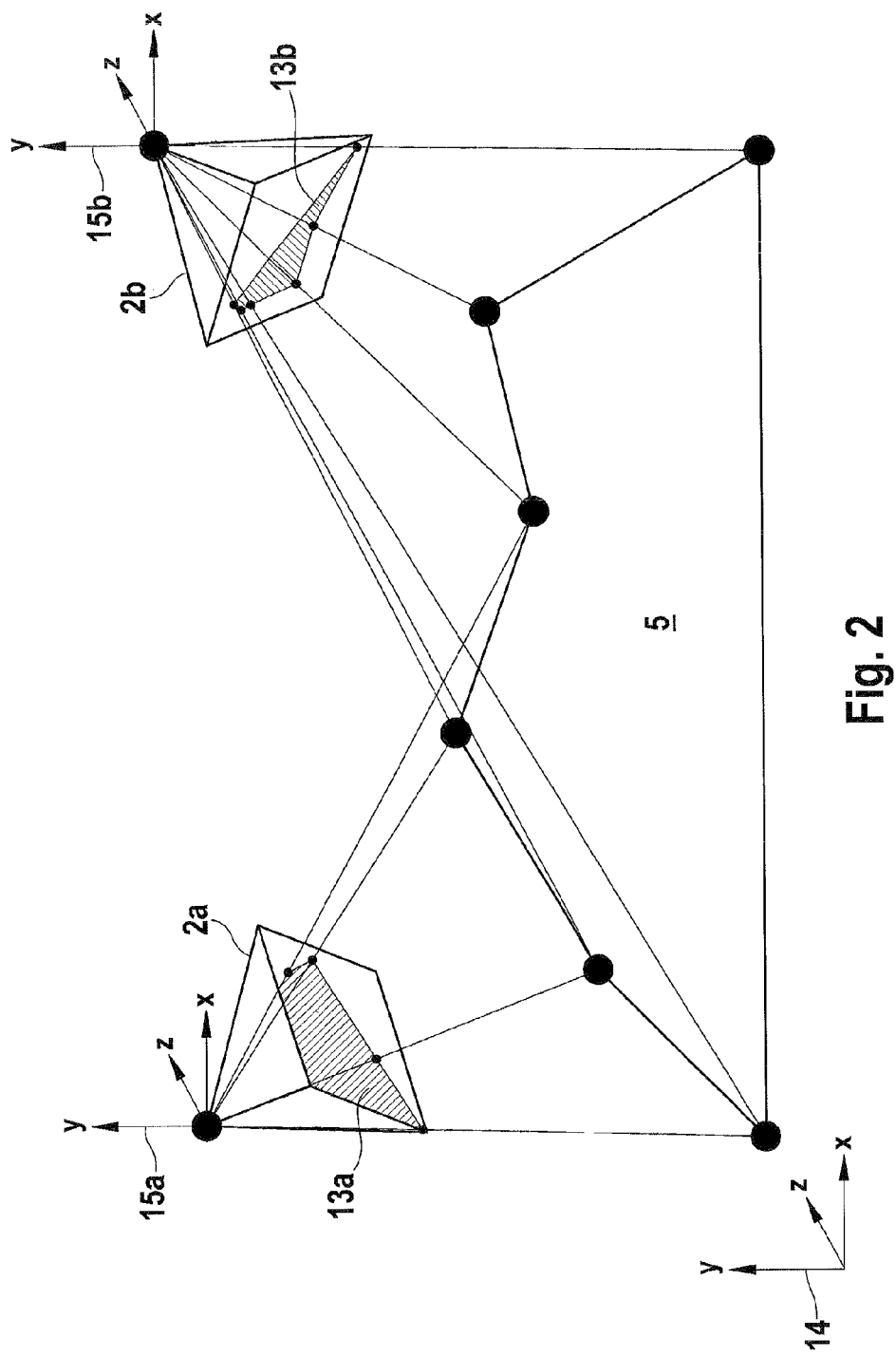
FIG. 2 shows, likewise in a schematic depiction, an illustration of the projection of model coordinates in image point coordinates.

FIG. 2 illustrates the projection of surveillance target 5 from the model coordinates, which are indicated by a model coordinate system 14, into an image coordinate system 15a or 15b of surveillance cameras 2a and 2b. The model coordinate system is related to a global coordinate system, in which room 3 is located, in a fixed, unambiguous manner.

When surveillance target 5 is projected onto image coordinate system 15b of surveillance camera 2b, entire surveillance target 5 is depicted on an image plane in the image coordinate system, and the position of the image plane is defined by the image-acquisition unit of surveillance camera 2b. The imaging specification is generated by the camera data, i.e., the position and orientation of surveillance cameras 2a and 2b, in particular, and a camera model that describes the optical imaging properties.

In a further step, depicted surveillance target 5 is cropped on the edges, the cutting boundaries being defined by the detection region of surveillance cameras 2a, b, that is, ultimately by the (effective) size of the image-acquisition unit or another aperture of surveillance cameras 2a, b. As an option, a hidden-region checking device 16 may be provided in configuration module 6, which checks to determine whether surveillance object 5 is hidden by further objects in model 10 and, if so, deactivates further regions, in particular the hidden regions of surveillance target 5. The remainder of depicted surveillance region 5 is surveillance target section 13a, b which may be observed by surveillance cameras 2a and *b*. Surveillance target sections 13a, b correspond to real regions in room 3 in global coordinates.

The position and expansion of surveillance target sections 13a, b in image coordinates is output at surveillance devices 17a-d which are decentrally integrated in surveillance cameras 2a-d. For example, surveillance cameras 2a-d are designed as "intelligent cameras" which include processor units that are integrated in and/or assigned to the separate housing.

During surveillance, surveillance target sections 13a, b are monitored on surveillance devices 17a-d using digital image processing to identify events that are detectable using image processing algorithms. Events of this type may be the stepping on, passing over, touching, etc. of surveillance target sections 13a, b, changes in color, contrast, or content, and/or object detection and/or recognition in surveillance target sections 13a, b.

What is claimed is:

1. A configuration module (6) for a video surveillance system (1) comprising a plurality of surveillance cameras (2a-d) which are and/or may be distributed throughout a surveillance region (3), comprising:
   a model memory (7) which is designed to provide a model (10) of the surveillance region (3), camera data of the surveillance cameras (2a-d) being entered and/or referenced in the model (10);
   an input interface (11) for the input of at least one surveillance target (5) into the model (10) of the surveillance region (3);
   a computing device (12) which determines at least one camera-specific surveillance target section (13a, b) for at least one of the surveillance cameras (2a, b) based on the surveillance target (5) that was input;
   a hidden-region checking device (16) which is designed to a check whether the surveillance target (5) is hidden in front of one of the surveillance cameras (2a-d); and
   a human-machine interface configured to enable an observer to draw the surveillance target (5) in the model (10) of the surveillance region (3) independently of a position of each of the surveillance cameras (2a-d) in the surveillance region (3);
   wherein the camera data include a camera position and a camera orientation.

2. The configuration module (6) as recited in claim 1, wherein the surveillance target extends across the detection range of at least two of the surveillance cameras, and the computing device (12) determines camera-specific surveillance target sections (13a, b) for the at least two surveillance cameras (2a, b) based on the surveillance target (5) that was input.

3. The configuration module (6) as recited in claim 1, wherein the surveillance target (5) is stationary in the surveillance region.

4. The configuration module (6) as recited in claim 1, wherein the surveillance target (5) and/or the surveillance target section (13a, b) are/is designed as a line, a continuous line, a surface, and/or a three-dimensional section.

5. The configuration module (6) as recited in claim 1, wherein the model (10) is designed as a 2-D or 3-D model.

6. The configuration module (6) as recited in claim 1, wherein the camera data include a camera model.

7. The configuration module (6) as recited in claim 1, wherein the computing device (12) is programmed and/or electronically configured to generate the surveillance target sections (13*a, b*) by projecting the surveillance target (5) into the image coordinate system (15*a, b*) of the corresponding surveillance camera (2*a-d*).

8. The configuration module (6) as recited in claim 1, further comprising a hidden-region checking device configured to determine whether the surveillance target is hidden by further objects in the model.

9. The configuration module (6) of claim 8, wherein said hidden-region checking device is further configured to deactivate hidden regions of the surveillance target if said hidden-region checking device determines that the surveillance target is hidden by said further objects.

10. A video monitoring system (1) comprising a plurality of surveillance cameras (2*a-d*) which are and/or may be distributed throughout a surveillance region (3), characterized by a configuration module (6), said configuration module (6) comprising
a model memory (7) which is designed to provide a model (10) of the surveillance region (3), camera data of the surveillance cameras (2*a-d*) being entered and/or referenced in the model (10);
an input interface (11) for the input of at least one surveillance target (5) into the model (10) of the surveillance region;
a computing device (12) which determines at least one camera-specific surveillance target section (13*a, b*) for at least one of the surveillance cameras (2*a, b*) based on the surveillance target (5) that was input;
a hidden-region checking device (16) which is designed to a check whether the surveillance target (5) is hidden in front of one of the surveillance cameras (2*a-d*);
wherein a human-machine interface is included and is configured to enable an observer to draw the surveillance target (5) in the model (10) of the surveillance region (3) independently of a position of each of the surveillance cameras (2*a-d*) in the surveillance region (3); and
wherein the camera data include a camera position and a camera orientation.

11. The video monitoring system (1) as recited in claim 10, further comprising at least one surveillance device (17*a-d*) which is designed to monitor at least one of the surveillance target sections (13*a, b*) using digital image processing algorithms.

12. The video monitoring system (1) as recited in claim 10, further comprising a plurality of surveillance devices (17*a-d*), in which at least one or exactly one surveillance camera (2*a-d*) is assigned to each surveillance device (17*a-d*).

13. The video monitoring system (1) as recited in claim 10, wherein at least one surveillance camera (2*a-d*) is designed as an intelligent camera, and/or the surveillance device (17*a-d*) is integrated locally in the surveillance camera (2 *a-d*).

14. A method for configuring a configuration module (6) for a video surveillance system (1) including a plurality of surveillance cameras (2*a-d*) distributed throughout a surveillance region (3), where the configuration module includes a model memory (7) for storing a model (10) of the surveillance region (3) with camera data of the surveillance cameras (2*a-d*) including at least camera position and orientation; an input interface (11) for entering a surveillance target (5) into the model (10) of the surveillance region (3); a computing device (12) for determining at least one camera-specific surveillance target section (13*a, b*) for at least one of the surveillance cameras (2*a, b*) based on the surveillance target (5); a hidden-region checking device (16) for checking whether the surveillance target (5) is hidden in front of one of the surveillance cameras (2*a-d*); and a human-machine interface for drawing the surveillance target (5) in the model (10) of the surveillance region (3) independently of a position of each of the surveillance cameras (2*a-d*) in the surveillance region (3) comprising steps of:
using the human-machine interface, inputting the surveillance target (5) into the model (10) of the surveillance region (3); and
using the computing device (12), converting the surveillance target (5) to the at least one camera-specific surveillance target section (13*a, b*).

15. A computer program product embodied in a non-transitory computer readable medium and comprising a set of computer readable instructions for carrying out all steps of the method as recited in claim 14, when the computer program product is run on a computer or the computing device (12) of the video surveillance system (1).

* * * * *